Patented Dec. 30, 1941

2,268,353

UNITED STATES PATENT OFFICE 2,268,353

STABILIZATION OF INSECTICIDE MATERIALS

William P. ter Horst, Packanack Lake, N. J., assignor to United States Rubber Company, New York, N. Y., a corporation of New Jersey No Drawing. Application April 14, 1939,
Serial No. 267,920

5 Claims. (Cl. 167—24)

This invention relates to stabilization of insecticide materials.

It is known that insecticide materials such as are commonly known as derris powder, which is made by grinding derris root (*Derris elliptica*), rapidly deteriorate when exposed to sun and/or light. The deterioration is accompanied by a corresponding loss in insecticidal powder which makes it necessary for one to spray or dust at frequent intervals. The same is true for other insecticidal materials such as, rotenone, timbo root (*Lonchocarpus urucu*), cube root (*Lonchocarpus utilis*), ground pyrethrum flowers, and others. This deterioration also takes place when extracts of these roots are used instead of the ground roots, and the stabilizers described herein may be used in conjunction with derris resins or with derris extracts.

It has been found that aryl-sulfonylamino-diarylamines having the general formula $R_1$—NH—$R_2$—NH—$SO_2$—R, where R and $R_1$ represent aryl groups, and $R_2$ an arylene group, are useful in preventing the deterioration of insecticide material.

Particularly effective for the purpose are:
p-(p-toluene sulfonyl amino) diphenylamine

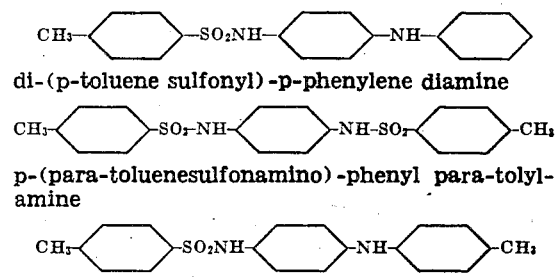

di-(p-toluene sulfonyl)-p-phenylene diamine p-(para-toluenesulfonamino)-phenyl para-tolylamine The tests described below illustrate the usefulness of these stabilizers:

In Test I, which is the control experiment, untreated derris powder containing 5% of rotenone was used. Toxicity tests were made before and after exposure to light of a 900 watt mercury vapor sunlamp. The samples were held at a distance of 18 inches from the bulb of the lamp.

In Test II, a similar derris powder, however, in addition containing 5% p-(para-toluenesulfonamino)-phenyl para-tolylamine, was used.

In Test III, a similar derris powder containing 5% di-(p-toluene sulfonyl) p-phenylene diamine was used.

In Test IV, a similar derris powder, containing 5% p-(p-toluene sulfonylamino) diphenylamine was used. As test organisms, black bean aphids (*Aphis rumicis*) were used on nasturtiums as the host. The samples were thoroughly mixed at frequent intervals during the exposure period. The insecticides were used in the form of water dispersions containing one pound insecticide per 200 gals. of water.

The plants were sprayed on a turntable, making 15 revolutions per minute. The time of spraying was 30 seconds (15 seconds up, 15 seconds down), and the pressure was 25 lbs./sq. in. The mortality was determined 24 hours after spraying.

Table I

| Chemical | Total number of insects | Percent dead at end of 24 hours |
| --- | --- | --- |
| Derris containing 5% rotenone (untreated and unexposed) | 682 | 54.3 |
| Derris containing 5% rotenone (untreated and exposed 36 hours to a mercury vapor sunlamp) | 1,066 | 38.9 |
| Check; untreated plants | 480 | 4.1 |
| Derris containing 5% rotenone to which was added 5% p-(p-toluene sulfonylamino) diphenylamine exposed 36 hours under sunlamp | 601 | 55.9 |
| Derris containing 5% rotenone to which has been added 5% di-(p-toluene sulfonyl) p-phenylene diamine exposed 36 hours under sunlamp | 537 | 62.9 |
| Derris containing 5% rotenone to which has been added 5% p-(para-toluenesulfonamino) - phenyl para-tolylamine exposed 36 hours under sunlamp | 834 | 57.3 |

The results clearly show how rapidly derris powder deteriorates in sunlight and how these stabilizers maintain the toxicity.

Derris is known to be an efficient repellent for certain insects such as clothes moths, carpet beetles, Mexican bean beetles and Japanese beetles. The repellency toward these insects rapidly diminishes on exposure to the atmosphere. Incorporation of the stabilizers described herein will greatly prolong the repellent action of derris in the field.

The concentration of the stabilizers may be more or less than 5%. In preparing the stabilized powder the stabilizer is preferably added prior to or during the grinding of the derris root or the like, although it may instead be added after the grinding. The so-stabilized insecticides may be used in the form of a dust or as a spray with or without the addition of suitable auxiliary ingredients such as wetting agents, spreading agents, sticking agents, etc. Mixtures of these stabilized insecticides with other insecticides, insect repellents, or with fungicides fall within the scope of the invention.

Having thus described my invention, what I claim and desire to protect by Letters Patent is:

1. An insecticide preparation comprising an insecticide from the class consisting of derris root, rotenone, timbo root, cube root, and pyrethrum flowers, and as a stabilizer therefor an acidylamino diarylamine having the general formula $R_1-NH-R_2-NH-SO_2-R$, where R and $R_1$ represent aryl groups and $R_2$ an arylene group.

2. An insecticide preparation comprising an insecticide from the class consisting of derris root, rotenone, timbo root, cube root, and pyrethrum flowers, and as a stabilizer therefor p-(p-toluene sulfonylamino) diphenylamine.

3. An insecticide preparation comprising an insecticide from the class consisting of derris root, rotenone, timbo root, cube root, and pyrethrum flowers, and as a stabilizer therefor di-(p-toluene sulfonyl) p-phenylene diamine.

4. An insecticide preparation comprising an insecticide from the class consisting of derris root, rotenone, timbo root, cube root, and pyrethrum flowers, and as a stabilizer therefor p-(para-toluenesulfonamino)-phenyl para-tolylamine.

5. An insecticide preparation comprising an insecticide from the class consisting of derris root, rotenone, timbo root, cube root, and pyrethrum flowers, and as a stabilizer therefor an acidylamino diarylamine having the general formula $R_1-NH-R_2-NH-SO_2-R$, where R and $R_1$ represent aryl groups of the benzene series and $R_2$ an arylene group of the benzene series.

WILLIAM P. ter HORST.